Figure 1:
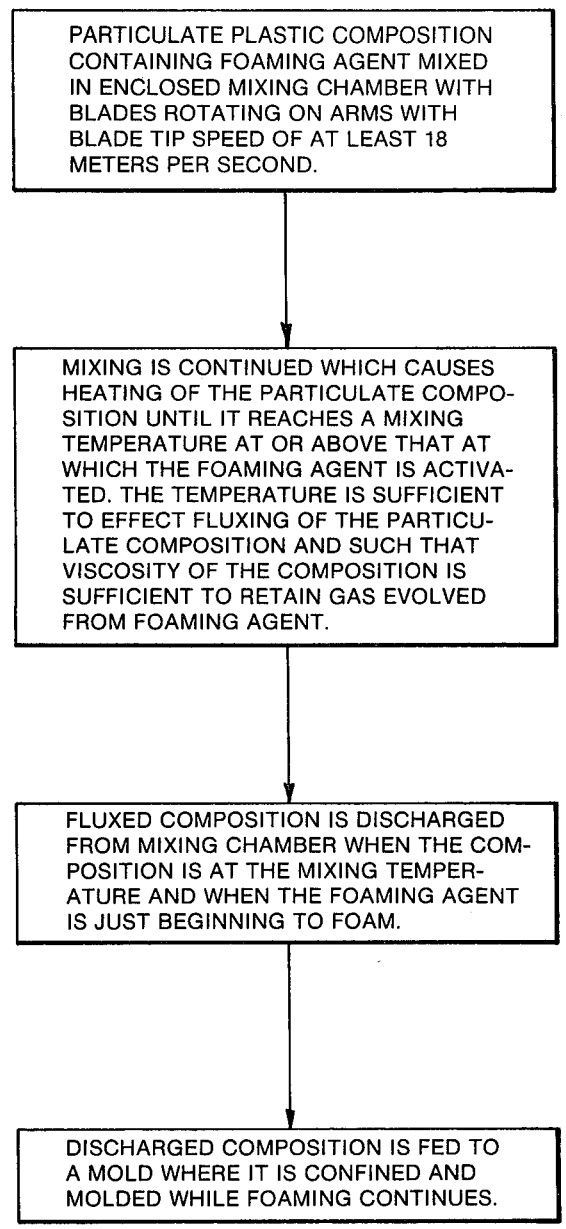

United States Patent [19]

Crocker

[11] 4,448,738
[45] May 15, 1984

[54] PROCESS FOR PRODUCING FOAMED PLASTIC ARTICLES

[75] Inventor: Zenas Crocker, Quebec, Canada

[73] Assignee: Synergistics Chemicals Ltd., Ontario, Canada

[21] Appl. No.: 358,046

[22] Filed: Mar. 15, 1982

Related U.S. Application Data

[63] Continuation of Ser. No. 149,642, May 14, 1980, abandoned.

[51] Int. Cl.$^3$ .............................................. B29D 27/04
[52] U.S. Cl. ........................................ 264/54; 241/93; 264/68; 264/DIG. 5; 264/DIG. 60; 366/77; 425/200; 425/817 R
[58] Field of Search ................... 264/54, DIG. 60, 68, 264/DIG. 5; 366/77; 241/94; 425/817 R, 200

[56] References Cited

U.S. PATENT DOCUMENTS

| | | | |
|---|---|---|---|
| 2,525,965 | 10/1950 | Smith | 264/DIG. 60 |
| 2,654,913 | 10/1953 | Maier | 264/DIG. 60 |
| 2,806,255 | 9/1957 | Dietz | 264/54 |
| 3,037,474 | 6/1962 | Navikas | 264/DIG. 60 |
| 3,266,738 | 8/1966 | Goeser et al. | 241/93 |
| 3,564,602 | 2/1971 | Peck | 264/DIG. 60 |
| 4,059,661 | 11/1977 | Eck et al. | 264/54 |
| 4,142,804 | 3/1979 | Crocker | 366/77 |
| 4,230,615 | 10/1980 | Crocker et al. | 366/77 X |

FOREIGN PATENT DOCUMENTS

| | | | |
|---|---|---|---|
| 1241409 | 8/1971 | United Kingdom | 264/46.6 |
| 1320982 | 6/1973 | United Kingdom | 264/DIG. 60 |

OTHER PUBLICATIONS

Cram, D. J., C. M. Lavender, R. A. Reed and A. Schofield, "The Free Expansion of P.V.C. Using Azodicarbonamide," in *British Plastics*, Jan. 1961, pp. 24–29.

*Modern Plastics*, "Foams: an Extra Hand for Vinyl--Coated Fabrics," vol. 38, No. 9, May 1961, pp. 162–164, 303.

Lasman, Henry R., "Foaming Agents for Polyolefins," in *SPE Journal*, Sep. 1962, pp. 1184–1192.

Franze, John P., "PVC Foam From Powder," in *SPE Journal*, vol. 25, Jul. 1969, pp. 30–32.

"Waittington's Dictionary of Plastics," by Lloyd R. Waittington, Stamford, Conn. Technomic, ©, 1968, pp. 25, 250 and 256.

*Primary Examiner*—Philip E. Anderson
*Attorney, Agent, or Firm*—Larson and Taylor

[57] ABSTRACT

An improvement is disclosed in a process for producing foamed articles of thermo-plastic or thermo-setting compounds. The improvement reduces the number of steps normally followed to make a foamed product and cuts down on the time. The improvement comprises the steps of intensively mixing and thermokinetically heating a batch of the compounds with a foaming agent having a preselected trigger temperature to initiate gas evolution, the mixing and heating occurring in an enclosed mixing chamber with a plurality of blades attached to arms rotating about an axis, with a blade tip speed of at least about 18 meters per second, mixing until the compounds and the foaming agent are heated above the trigger temperature of the foaming agent to a mixture having a predetermined discharge temperature representing a state of flux of the compounds suitable for forming and the mixture having a viscosity sufficient to contain gas evolved from the foaming agent, discharging the batch from the chamber when the batch reaches the predetermined temperature, and feeding the mixture from the discharged batch to a forming unit while foaming is still occurring.

11 Claims, 2 Drawing Figures

PROCESS FOR PRODUCING FOAMED PLASTIC ARTICLES

This is a continuation, of the application Ser. No. 149,642, filed May 14, 1980, and now abandoned.

The present invention relates to a process for producing foamed articles of thermo-plastic and thermo-setting compounds.

Synthetic polymers generally fall into two classes, thermo-plastic polymers which can be converted from solid to liquid state by heating, and upon cooling resume their previous physical characteristics without undergoing change in chemical composition, and thermo-setting polymers which cannot be converted from the solid to the liquid form by heat without undergoing some form of chemical change. Virtually every polymer that has ever been made has at some time or another been foamed. Foaming occurs by dispersing gas directly or from chemical foaming agents into the material when it is in viscous form. When the plastic material solidifies the gas is either totally incapsulated in discrete cells within the material, or is unconfined so it can move through interconnected passages in the plastic material. These two types of foaming are known as the so-called closed cell or open cell types of foams.

Foamed materials have many uses including insulation, packaging, structural and decorative parts, and flotation devices. In some instances foamed materials reduce material costs by producing more bulk per unit weight. Flexible foams may be used in cushioning, filters, packaging, clothing and many other uses. The densities of foam plastics vary over a wide range. An example of a typical density range is from 0.1 to 60 lbs per cubic foot. Flame retardant versions of foams are readily available. One method of foaming plastic materials is by mixing or injecting the compounds with volatile liquids or gases, which expand during processing. The mixing generally has to include a blending step to ensure uniform distribution throughout the mixture of the compounds before processing. Another method of foaming is by intimately mixing a chemical foaming agent with the polymer. This foaming agent evolves a gas at a predetermined trigger temperature and expands in the viscous polymer. However, all the known foaming processes have certain process disadvantages. One such disadvantage is the requirement that the molding of the foamed product usually has to be done under high pressures. Another disadvantage in molding or otherwise shaping foamed plastic articles is the necessity during most of the processes to maintain the compounds under the trigger temperature of the foaming agent, and then heat the compounds further after they have been placed in the mold or other shaping device to initiate evolution of gas from the foaming agent. in flexible foam applications, one method is to disperse PVC compounds in a liquid plasticizer. Foaming is then accomplished by a chemical foaming agent, or by mechanical frothing. In both cases, however, high pressures and long cycle times in the final stages of forming tend to make these methods expensive. Flexible foamed PVC compounds may also be made in extruders from special grades of PVC compounds. Flexible foam applications include such items as door seals, gaskets, cable insulation, etc.

Most known processes of making a foamed article include four steps; the mixing step, wherein the compounds are mixed with a foaming agent, for PVC this includes a milling process to ensure a uniform mixing throughout the mixture, then a mold filling step wherein the mixture is placed in molds followed by a heating and cooling cycle in a press under high pressures and generally for a time in excess of 30 minutes. Foaming occurs in this final step in the mold which can last for as long as 60 minutes. Thus, for example, the time to make a foamed PVC article may be in excess of 2 hours.

The present invention provides a simple and rapid process for the production of foamed thermo-plastic and thermo-setting articles. The process reduces the number of steps necessary in most of the previously known techniques, avoids the high pressures usually necessary in the molds or other shaping devices and also the long cycle times that are required to produce foamed thermo-setting and thermo-plastic articles.

By using a high intensity mixer, it has been found that the plastic compounds and foaming agent can be mixed and fluxed in a very short time cycle and immediately formed in a mold or other shaping means at lower operating temperatures and lower pressures than previously thought possible.

The present invention provides in a process for producing foamed articles of thermo-plastic or thermo-setting compounds, the improvement comprising the steps of: intensively mixing and thermokinetically heating a batch of the compounds with a foaming agent having a pre-selected trigger temperature to initiate evolution of gas from the foaming agent, the mixing and heating occurring in an enclosed mixing chamber with a plurality of blades attached to arms rotating about an axis, with a blade tip speed of at least about 18 meters per second, mixing until the compounds and the foaming agent are heated above the trigger temperature of the foaming agent to a mixture having a predetermined temperature representing a state of flux of the compounds suitable for forming and the mixture having a viscosity sufficient to contain gases evolved from the foaming agent; discharging the batch from the chamber when the batch reaches the predetermined temperature, and feeding the mixture from the discharged batch to a forming means whilst volatization is still occurring.

In further embodiments of the invention, the compounds and the foaming agent may be fed into the mixing chamber at the same time, or the foaming agent may be added to the mixing chamber after commencement of mixing the compounds. When the plastic compounds are rigid or flexible polyvinyl chloride or a low density polyethylene resin, a preferred foaming agent is azodicarbonamide, or para, para-oxybis (benzenesulfonylhydrazide). The blade tip speed in the mixing chamber is preferably in the range of about 31-38 meters per second, and the predetermined temperature is preferably in the range of about 190°-240° C. The batch produced in this preferred range generally reaches this predetermined temperature in about 7-20 seconds. In other embodiments the forming means includes a molding means, shaping means, extruder, or a press which operates under a pressure in the range of about 80-320 lbs per square inch, and the time in the press is not more than about 5 minutes.

High intensity mixers may be used in the fluxing of thermo-plastic and thermo-setting materials. One type of high intensity mixer is shown by Goeser et al in U.S. Pat. No. 3,266,738 published Aug. 16, 1966. This patent describes a high intensity mixer available on the market today under the trade name Drais-Gelimat. The mixer includes a plurality of blades which rotate about an axis within an enclosed container. In co-pending application Ser. No. 962,778 filed by me jointly with Ved P. Gupta on Nov. 21, 1978 U.S. Pat. No. 4,230,615, a system is provided for monitoring the batch temperature in a high intensity mixer separately from the mixer temperature, and then discharging the batch from the mixer when the batch temperature reaches a final predetermined level.

Figure 2:
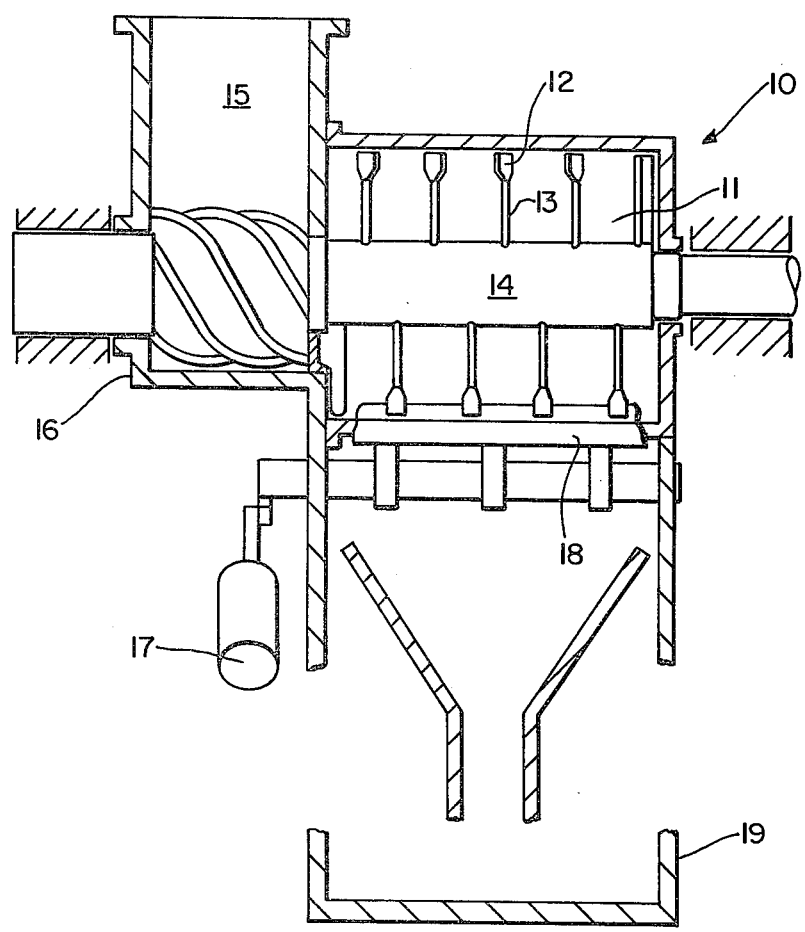

FIG. 1 is a block diagram flow sheet of a method in accordance with the present invention; and FIG. 2 is a diagrammatic side elevation cross-sectional view, of a high intensity mixer described in Goeser U.S. Pat. No. 3,266,738.

Another method of controlling the amount of mixing is disclosed in U.S. Pat. No. 4,142,804 issued Mar. 6, 1979 to Crocker. This patent discloses a method of controlling the state of flux of a batch issuing from a high intensity mixer by monitoring vibration in the mixer and discharging the batch from the mixer when the vibration reaches a preset level representing a particular state of flux.

In a series of tests, batches of thermo-setting or thermo-plastic compounds were added to a high intensity mixer, together with a foaming agent and processed in a Drais-Gelimat high intensity mixer, which had a blade tip speed above 18 meters per second. In some cases the foaming agent was added at the same time as the compounds, in other cases, the Gelimat had a screw conveyor feeding the compounds into the interior of the mixing chamber, and the foaming agent was added via the screw conveyor after the mixing step had commenced. The total time in the mixer did not exceed 30 seconds, although the weight of the batch fed into the mixer varied from 100 gms to 300 gms depending on the size of the batch required.

The method in accordance with the invention is carried out in a sequence of steps as set forth in the flow sheet of FIG. 1. Mixing may be carried out in a high intensity mixer of the type shown in FIG. 2 and described in detail in Goeser, U.S. Pat. No. 3,266,788. With reference to FIG. 2, the mixer 10 includes an enclosed mixing chamber 11 with blades 12 rotating on arms 13 on shaft 14. Ingredients are introduced through a supply funnel 15 from where they are conveyed, by worm 16, to the enclosed mixing chamber. A hydraulic cylinder 17 is provided to actuate discharge flap 18 for discharging the contents of the mixing chamber. The discharged mass is fed to a mold 19 where, after closing the mold foaming continues while the mass is confined within the mold.

In a preferred embodiment the temperature of the batch within the mixer was determined by measuring the infrared radiation from that batch so that the temperature of the batch was measured separately from the temperature of the mixer and mixer blades in accordance with the system and method disclosed in U.S. Pat. No. 4,230,615. The temperature of the batch was set to control the instant of discharge. The temperature was selected so that the plastic compounds as discharged from the high intensity mixer had fluxed and were in a viscous state which could be fed into a mold or other shaping means for forming into a finished article. The temperature of the batch at discharge was higher than the trigger temperature of the foaming agent so that foaming or evolution of gas from the foaming agent had been initiated in the high intensity mixer before the batch was discharged from the mixer and yet had not progressed extensively due to the short time before discharge from the mixer. As soon as the batch was discharged from the mixer it was immediately and without undue delay fed into a mold and then pressed and contained in the mold until foaming was completed and the article cooled although foaming had already started in the mixer when the trigger temperature of the foaming agent was reached and the batch had a viscosity sufficient to contain the gases evolved from the foaming agent. The trigger temperature has to be high enough to initiate evolution of gas from the foaming agent at about the same time or after fluxing of the compound has reached a sufficient state of viscosity to contain the gases of volatization. If the trigger temperature is too low, the evolved gases dissipate into the atmosphere and are not contained in the compound. The batch, as discharged from the mixer, may be placed in a mold, an extruder or other shaping means. If a foamed plate or sheet is to be made, then the fluxed batch is placed between two flat surfaces, contained and compressed. The pressure between these flat surfaces need not exceed 320 lbs per square inch, and the press may be unheated because the temperature of the fluxed material is sufficiently high to ensure that foaming is maintained. Foaming then continues until the material fills the mold and commences to harden. Because the material foams in unheated molds and no exterior heat is necessary, there is no limitation as to the thickness of the material that may be molded. Articles up to almost any thickness may be foamed inasmuch as the heat comes from the interior of the fluxed material and not from exterior surfaces. In some cases the exterior surfaces of the mold or other shaping devices may be preheated to ensure that there is no excessive cooling of the material adjacent to the two exterior surfaces. Since foaming occurs by decomposition of the chemical foaming agent to release gases over the period of time that the chemical reaction occurs, loss of available gas for foaming can be limited by precise control in milliseconds of the instant of discharge of the foaming batch and rapid feeding of this foaming batch to the shaping device.

Two types of foaming agents were used in experiments illustrating the process of the present invention. An azodicarbonamide sold under the trade mark Ficel-AC/4 which has a trigger temperature in the range of 190°–220° C. This trigger temperature can be lowered to 170° C. by metal salt stabilizers often present in flexible PVC compounds.

The second foaming agent is a para, para-oxybis (benzenesulfonylhydrazide) sold under the trade mark Celogen OT. This foaming agent has a trigger temperature in the range of 130°–160° C. and most efficiently this trigger temperature was above 150° C. This particular foaming agent is recommended for injection and compression molding in PVC and low density polyethylene. It is particularly useful for obtaining cellular structures with thin or thick non-cellular skins.

The compounds used in the tests were, a rigid PVC powder identified by the trade name CTR-12D which contains 0.5% Ficel-AC/4 foaming agent, a rigid PVC compound used in film manufacture referred to as CGP-1100, a rigid vinyl siding compound referred to as BPVS and a rigid PVC piping compound containing 300 parts of 366 resin, 1.8 parts of TM692, 1.2 parts of CAST 6, 3.0 parts of K1.25 and 6.0 parts of Atomite. Another plastic compound was a plasticized PVC product known as R7203A. A low density polyethylene coded EXPY 134-175 had a melt index of 4.4 and was also foamed.

slight preheat of the mold was needed to remove the heat sink effect of this rather heavy metal mold.

TABLE

| Example & Compound Type | Weight of Compound in batch Grms | Foaming Agent | Weight of Agent % | Weight of Agent Grms. | Blade tip Speed Meters/ secs. | Mixer Jacket Cooling | Discharge Temp. °C. | Initial Mixer Temp. °C. | Cycle Time in Mixer secs. | Pressure in Press lbs/sq. in. (Approx.) | Press Temp. °C. | S.G. of Foam |
|---|---|---|---|---|---|---|---|---|---|---|---|---|
| 1 CTR-12$^D$ | 300 | Ficel AC/4 Present in Compound | 0.5 | — | 38 | No | 215 | 90 | 14.5 | 320 | 180 | 1.29 |
|  | 300 | Ficel AC/4 added at 220° C. | 0.5 | 1.5 | 38 | No | 240 | 114 | 14 | 320 | 180 | <1 (floated in water) |
| 2 CGP-1100 | 300 | Ficel AC/4 added at 135° C. | 0.6 | 2.0 | 38 | No | 227 | 112 | 8.5 | 320 | 180 | <1 (floated in water) |
|  | 170 | Ficel AC/4 premixed | 0.6 | 1.0 | 38 | Yes | 227 | 48 | 7.5 | 320 | Cold | 0.7 |
|  | 170 | Ficel AC/4 premixed | 0.6 | 1.0 | 38 | Yes | 227 | 58 | 7.0 | 80 | Cold | 0.7 |
| 3 BPVS | 300 | Ficel AC/4 added after 12 secs. | 0.6 | 2.0 | 38 | No | 230 | 56 | 14 | 80 | Cold | 1.17 |
| 4 P35DL | 170 | Ficel AC/4 premixed | 0.6 | 1.0 | 38 | No | 235 | 88 | 16 | 80 | 180 | <1 (floated in water) |
| 5 R7203A | 150 | Ficel AC/4 premixed | 0.7 | 1.0 | 36 | No | 200 | 58 | 10 | 80 | 180 | 0.71 |
| 6 P.E. | 140 | Celogen OT premixed | 0.6 | 0.84 | 31 | Yes | 190 | 56 | 20 | 80 | Cold | 0.65 |

EXAMPLE 1

As may be seen from the Table, 300 grams of rigid PVC compound identified as CTR 12D was processed in a high intensity mixer, the foaming agent was present at 0.5% by weight of the compounds, the high intensity mixer had a blade tip speed of 38 meters per second, and no cooling of the mixer was included. In this first preliminary test the foaming agent was already premixed with the compounds when they were added to the mixer although not necessarily in the optimum amount, and the discharge temperature was 215° C. After discharging from the mixer, approximately half the batch was formed in a press with a temperature of about 180° C. and at a pressure of 320 lbs per square inch. The resulting foamed product had a specific gravity of 1.29 as compared to an unfoamed value of 1.35, indicating that some foaming had occurred. In the second test an additional 1.5 grams of foaming agent was added to the 300 grams of compounds after the batch in the mixer reached a temperature of 220° C. The discharge temperature was 240° C. and the product after being formed had a specific gravity of less than one because it floated in water.

EXAMPLE 2

Specific gravities of approximately 0.7 were obtained with foams made from CGP-1100 compounds with Ficel AC/4 foaming agent. The foaming agent was added in amounts of 0.3-1.2% by weight of the compounds. In other examples carbon black and titanium dioxide were added to the compounds without affecting the foaming properties. Pressures in the press as low as 80 lbs per square inch were satisfactory to produce the foamed product. In one particular simplified test, 170 grams of the compounds, plus 1 gram of the foaming agent were formed in a slightly preheated shoe sole mold to a density less than one by simply having a person stand on the retaining top plate of the mold. A The foamed rigid PVC material responded favourably to most normal wood working and joining techniques. It can be drilled, sawed, planed, sanded, routed and otherwise shaped. It also showed excellent retention of integrity as evidenced by the ability to reset numerous times large and small screws without loss of holding strength.

EXAMPLE 3

A rigid PVC formulation used for vinyl siding foamed well with 0.6% foaming agent added 12 seconds after commencement of the high intensity mixing cycle. The measured specific gravity of the foamed sheet was 1.17 indicating a marked reduction in the value of 1.49 for the fluxed material without foaming agent.

EXAMPLE 4

A rigid PVC piping compound foamed well under the tabulated conditions to give a specific gravity of just under 1.0 as contrasted with the unfoamed value of 1.38.

EXAMPLE 5

This flexible PVC compound has a specific gravity of 1.21 in the unfoamed state and readily foamed under a pressure of approximately 80 lbs per square inch to a measured specific gravity of 0.713.

EXAMPLE 6

Polyethylene was foamed with the Celogen OT foaming agent, having a lower triggering temperature than previously used. This product was foamed to a specific gravity of 0.65 as compared to the value of 0.90 for the same compound without a foaming agent put through the high intensity mixed at the same conditions.

Precise temperature control of this process by means of being able to discharge the batch from the high intensity mixer at the instant that the batch reaches a precise temperature, allows the condition where the foaming agent is just beginning to start foaming, even though the compound is at or near the melt state. If the foaming agent is added just before the batch reaches its discharge temperature, then minimum foaming occurs in the high intensity mixer, and most of the foaming occurs as soon as the heated batch is discharged and is being formed into the desired shape.

The foaming step of the present invention may be applied to other known processes used to feed various shaping means whereby the foaming is presently initiated by a further subsequent heating step. Various amendments may be made to the process defined herein without departing from the scope of the present invention, which is limited only by the scope of the claims.

The embodiments of the invention in which an exclusive property or privilege is claimed are defined as follows:

1. A method of making a molded foamed thermoplastic article from a particulate thermoplastic resin comprising:

intensively mixing and thermokenetically heating a particulate composition comprising thermoplastic resin particles and a foaming agent, said foaming agent having a trigger temperature at which a gas is evolved therefrom to effect foaming, said mixing and heating being effected by mixing said particulate composition in an enclosed mixing chamber with a plurality of blades attached to arms rotating within said chamber with a blade tip speed of at least about 18 meters per second;

continuing said mixing of said particulate composition in said enclosed chamber until said particulate composition is heated to a mixing temperature at or above said trigger temperature of said foaming agent, said mixing temperature being sufficient to effect fluxing of said particulate composition to an extent such that the fluxed composition has a viscosity sufficient to contain gas evolved from said foaming agent;

discharging the fluxed composition from said mixing chamber when the fluxed composition is at said mixing temperature and when said foaming agent is just beginning to foam; and feeding the discharged fluxed composition to a mold and confining the composition within said mold to mold the composition while foaming of said composition continues, to form a molded foamed plastic article in said mold.

2. A method according to claim 1 wherein said foaming agent and said resin particles are introduced into said mixing chamber at the same time.

3. A method according to claim 1 wherein said foaming agent is present in an amount of about 0.5 to 1.2% by weight of the composition.

4. A method according to claim 1 wherein said resin particles comprise a resin selected from the group consisting of polyvinyl chloride and low density polyethylene.

5. A method according to claim 4 wherein said blade tip speed is about 31-38 meters per second.

6. A method according to claim 4 wherein said foaming agent is selected from the group consisting of azodicarbonamide and para-oxybis (benzenesulfonylhydrazide).

7. A method according to claim 5 wherein said mixing temperature is about 190° to 240° C.

8. A method according to claim 7 wherein said mixing and heating is effected for about 7 to 20 seconds.

9. A method according to claim 1 wherein said composition is confined within said mold under a pressure of 80 to 320 lbs. per square inch.

10. A method according to claim 9 wherein said composition is confined within said mold under said pressure for not more than 5 minutes.

11. A method according to claim 1 wherein said foaming agent is introduced into said mixing chamber after said resin particles are introduced therein.

* * * * *